United States Patent [19]

Mutzl

[11] 4,092,215

[45] May 30, 1978

[54] RUPTURE PROTECTION DEVICE FOR STEAM GENERATORS OF SUBSTANTIALLY CYLINDRICAL SHAPE, PREFERABLY OF PRESSURIZED-WATER NUCLEAR POWER PLANTS

[75] Inventor: Josef Mutzl, Vienna, Austria

[73] Assignee: Kraftwerk Union Aktiengesellschaft, Mulheim, Germany

[21] Appl. No.: 727,796

[22] Filed: Sep. 29, 1976

[30] Foreign Application Priority Data

Sep. 30, 1975 Germany .............................. 2543663

[51] Int. Cl.² .............................................. G21C 9/00
[52] U.S. Cl. ......................................... 176/38; 176/87
[58] Field of Search .............................. 176/65, 87, 38

[56] References Cited

U.S. PATENT DOCUMENTS

| 3,443,631 | 5/1969 | Bremer et al. | 176/87 |
| 3,589,088 | 6/1971 | Seidl | 176/87 |
| 3,683,574 | 8/1972 | Vaessen | 176/87 |
| 3,930,943 | 1/1976 | Michel et al. | 176/87 |
| 3,990,941 | 11/1976 | Scholz | 176/87 |

FOREIGN PATENT DOCUMENTS

| 2,169,823 | 9/1973 | France | 176/87 |
| 1,098,114 | 1/1961 | Germany | 176/87 |
| 175,037 | 4/1961 | Sweden | 176/87 |
| 1,306,037 | 2/1973 | United Kingdom | 176/65 |

Primary Examiner—Samuel W. Engle
Assistant Examiner—Ralph Palo
Attorney, Agent, or Firm—Herbert L. Lerner

[57] ABSTRACT

Rupture protection device for a steam generator of substantially cylindrical shape, includes a rupture protection enclosure for surrounding the steam generator, the enclosure including a base, a cover and a jacket formed of tension-resistant and compression-resistant material, and axially stressable connecting means for connecting the base, the cover and the shell to one another, the jacket being formed of substantially cylindrical sections, the cover being formed of a substantially concave divided spherical shell and an undivided bearing ring, the spherical shell having an outer rim surface, the bearing ring being formed with an inner ring surface corresponding to the outer rim surface, the spherical shell being braced as a separate structural member through the outer rim surface thereof against the inner ring surface of the bearing ring, the bearing ring forming part of a bracing assembly including the base, the cover, and the substantially cylindrical jacket through the intermediary of the axially stressable connecting means.

7 Claims, 8 Drawing Figures

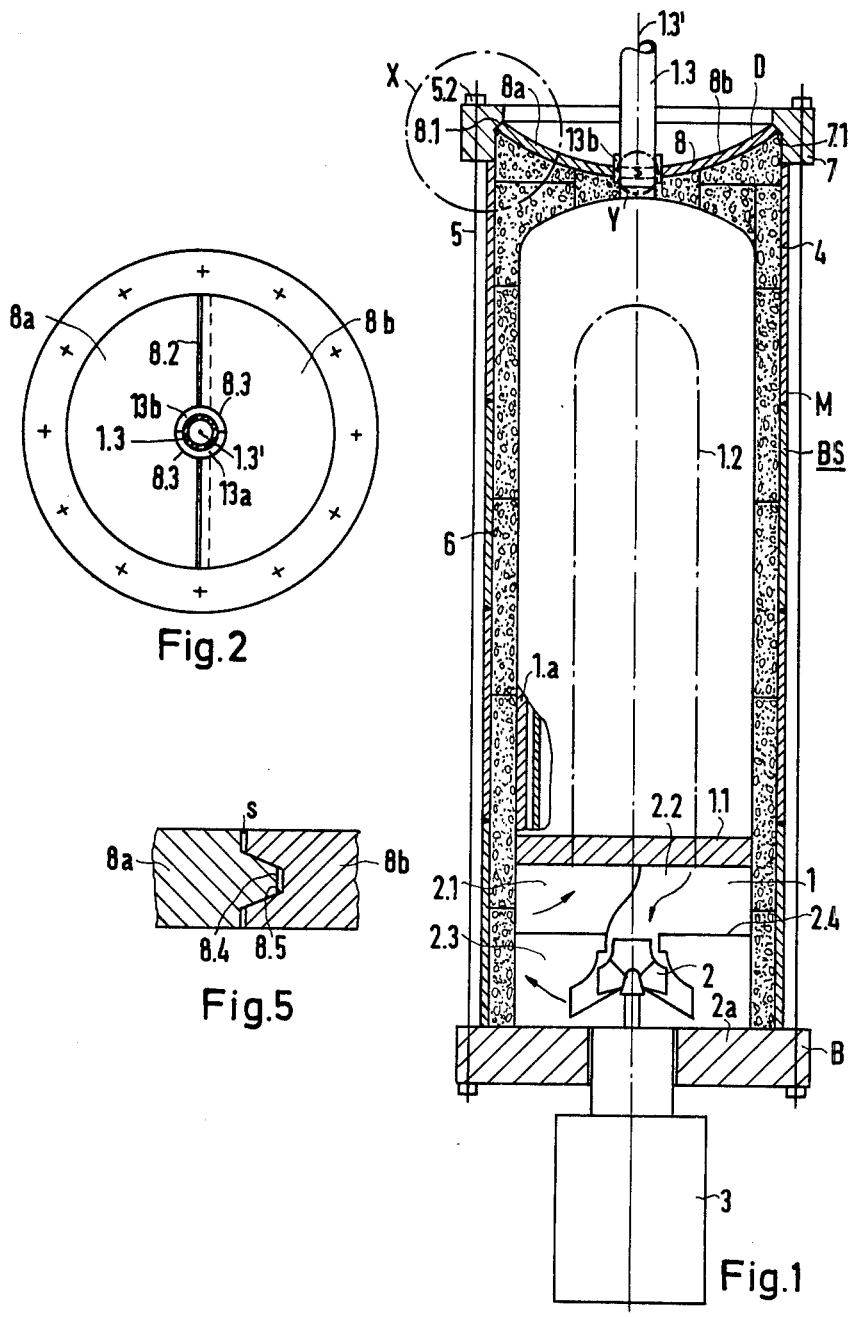

RUPTURE PROTECTION DEVICE FOR STEAM GENERATORS OF SUBSTANTIALLY CYLINDRICAL SHAPE, PREFERABLY OF PRESSURIZED-WATER NUCLEAR POWER PLANTS

The invention relates to a rupture protection device for steam generators of substantially cylindrical shape, preferably of pressurized-water nuclear power plants, and more particularly, with such a device having a rupture protection enclosure which includes a base, a cover and a shell or jacket of tension-resistant and compression-resistant material, such as steel, especially, the base, the cover and the shell or jacket being connected together by axially stressable connecting means, and the shell or jacket being formed of cylinder sections.

Such a device has become known heretofore from German Published Nonprosecuted Patent Application DT-OS 2 258 226. The objective thereof is to prevent damage to the containment and to devices relevant to safety engineering, in the event of a rupture of the steam generator. In heretofore known steam generator rupture protection systems; especially, an intermediate layer of compression-resistant, heat-insulating material, preferably of insulating concrete segments, is provided between the outer rupture protection enclosure and the steam generator and surrounding the steam generator in the region of the shell or jacket thereof. Such an insulating layer is advantageous for uniform force introduction and, furthermore, for the reason that the outer rupture protection enclosure is then at a lower temperature level than the steam generator. The effect of this heretofore known construction is that, in the event of a peripheral crack of the steam generator, the base and the cover are held together by axial tensioning elements which, in normal operation are not prestressed at all or only slightly prestressed. In this regard, the cover, which is constructed in the form of a plate, is stressed primarly in tension, except for the rim zone thereof, where the axial tensioning elements are anchored.

The invention is based upon the consideration that the stress conditions in such a cover can be made more favorable in a manner that not only can material be economized but that the cover can also be divided, which is an advantage from the point of view of assembly or installation.

It is accordingly an object of the invention to provide a rupture protection device with an improved cover which is manufacturable in a lighter-weight construction than heretofore and which is also improved with respect to the ease of assembly and disassembly thereof.

With the foregoing and other objects in view, there is provided, in accordance with the invention, a rupture protection device for a steam generator of substantially cylindrical shape, comprising a rupture protection enclosure for surrounding the steam generator, the enclosure including a base, a cover and a jacket formed of tension-resistant and compression-resistant material, and axially stressable connecting means for connecting the base, the cover and the shell to one another, the jacket being formed of substantially cylindrical sections, the cover being formed of a substantially concave divided spherical shell and an undivided bearing ring, the spherical shell having an outer rim surface, the bearing ring being formed with an inner ring surface corresponding to the outer rim surface, the spherical shell being braced as a separate structural member through the outer rim surface thereof against the inner ring surface of the bearing ring, the bearing ring forming part of a bracing assembly comprising the base, the cover, and the substantially cylindrical jacket through the intermediary of the axially stressable connecting means.

The advantages gained with the invention are seen primarily in that the cover, as an inwardly curved or concave spherical shell, is stressed only in compression in the event of a rupture, which signifies an increase in safety, the support ring being then able to be so constructed and of such dimensions that it reliably intercepts the axial forces and, above all, the radial forces coming from the spherical shell that occur in the case of a rupture. By dividing the upper cover, it is possible to lead the live steam line coming from the steam generator centrally out of the cover as has been done in steam generators heretofore. Disassembly of the cover, which is necessary for in-service testing on the steam generator, can also be readily accomplished with a centered live steam line due to the divided construction of the cover.

In accordance with other features of the invention, the spherical shell is divided into two half-shells and, with a steam generator having a housing with a cover, and a live steam line extending centrally out of the surface of the cover of the steam generator housing, the two half-shells have a parting gap therebetween extending through a location at which the axis of the live steam line extends, the spherical half-shells being formed with sector-shaped recesses at a radially inner periphery thereof surrounding the live steam line. The division of the spherical shell into two shell halves is advantageous because it facilitates assembly and installation, while the arch of the cover remains strong.

In accordance with another feature of the invention, the bearing ring includes an inner ring part on which the inner ring surface is formed, the inner ring part serving to absorb a vertical component of a force transmissible by the cover (explosive force), and for introducing the force into the bracing assembly, the bearing ring also including an outer ring part constructed for absorbing a radial component of the force transmissible by the cover, the outer ring part being of multilayer construction. In this manner, the advantage of multilayered parts for a cover subject to compressive stress combined with tensile stress, from the point of view of safety, is provided since, thereby, a different behavior of the material is obtained with respect to the steam generator, which is, of course, a thick-walled vessel stressed in tension.

In accordance with a further feature of the invention, the outer ring part is formed of a sheet-metal winding applied to the outer periphery of the inner ring part.

In accordance with an alternate feature of the invention, the outer ring part is formed of shrink rings shrunk fit on the outer periphery of the inner ring part.

In accordance with an added feature of the invention, the axially stressable connecting means comprise axial tensioning elements formed at tie rods distributed over the periphery of the substantially cylindrical jacket and anchored to the cover as well as to the base.

In accordance with an alternate feature of the invention, the axially stressable connecting means comprise axial tensioning elements formed as tensioning cables distributed over the periphery of the substantially cylindrical jacket and anchored to the cover as well as to the base.

In accordance with yet another alternate feature of the invention, the axially stressable connecting means comprise substantially circular welding seams welding said substantially cylindrical sections of said jacket to one another, and the upper endmost cylindrical section to said bearing ring of said cover.

In accordance with a further feature of the invention, the lower endmost cylindrical section of the jacket is connected by weldment to the base.

In accordance with an additional feature of the invention, the spherical shell is divided into two shell parts, and there is included a shear ring seatable in an annular groove formed in the inner periphery of the bearing ring for retaining the shell parts in braced condition at the bearing ring, the shell parts having a planar annular zone extending normally to the axis of the spherical shell, and the shear ring having an opposing surface portion projecting from the annular groove the planar annular zone of the shell parts engaging the opposing surface of the shear ring.

In accordance with yet a further feature of the invention, the inner ring part is a ribbed welded structure comprising a flat ring member at an end face thereof, the axially stressable connecting means comprising elongated axial tensioning elements distributed over the periphery of the substantially cylindrical jacket and anchored to the cover at the flat ring member as well as to the base, the ribbed welded structure additionally including a ring of axially-radially extending support ribs disposed in spaces formed peripherally in the flat ring member between the locations at which the axial tensioning elements are anchored, the ribbed welded structure further including a first contact ring part connected to the support ribs at the inner periphery of the inner ring part for supporting the spherical shell, and a second contact ring part connected to the support ribs at the outer periphery of the inner ring part for supporting the outer ring part.

In accordance with a concomitant feature of the invention, the rupture protection device includes an intermediate layer formed of pressure-resistant thermally-insulating material disposed between the rupture protection enclosure and the steam generator and surrounding the steam generator in the region of the jacket, the intermediate layer also covering the steam generator at the region of the cover.

Other features which are considered as characteristic for the invention are set forth in the appended claims.

Although the invention is illustrated and described herein as embodied in a rupture protection device for steam generators of substantially cylindrical shape, preferably of pressurized-water nuclear power plants, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic longitudinal sectional view of a steam generator having a rupture protection device according to the invention and axial tensioning elements as connecting means;

FIG. 2 is a top plan view of FIG. 1;

FIG. 3a is an enlarged fragmentary view of FIG. 1 showing a modified form of the detail x thereof which is provided with a welded and ribbed support ring and layers of sheetmetal strips applied to the periphery thereof;

FIG. 3b is a top plan view of FIG. 3a;

FIG. 4b is a top plan view of FIG. 4a;

FIG. 5 is an enlarged fragmentary view of FIG. 1 showing the detail Y i.e. the engagement of the spherical shell halves in the region of the parting gap therebetween.

Figures 3A, 3B:
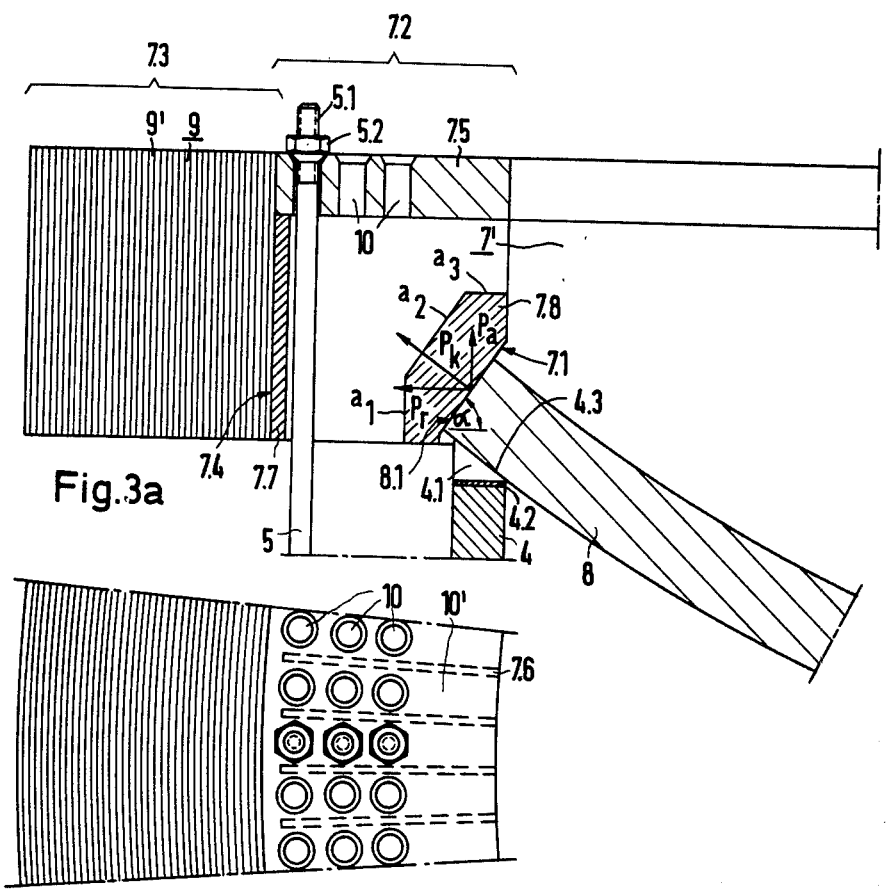

Referring now to the drawing and first, particularly, to FIG. 1 thereof, there is shown a rupture protection system according to the invention provided for a steam generator 1 of substantially cylindrical shape. This is preferably a steam generator that is connected into the primary loop of a pressurized-water nuclear power plant, the other components of the primary loop, such as the reactor, the main coolant pumps and the primary coolant lines being likewise rupture-protected so that, in the event of the Maximum Hypothetical Accident (MHA), namely the rupture of the main coolant line, the crack cannot widen and the flow cross section is thereby limited and, also, no fragments can be hurled into the containment. For the steam generator 1, this means that, in the case of rupture (even if very unlikely), fragments which might otherwise pierce the steel enclosure or skin 1a of the steam generator, cannot penetrate the rupture protection device, so that the release of radioactive fission products is prevented. In the case at hand, a steam generator 1 is involved which is structurally united with a main coolant pump diagrammatically indicated at 2 and having a pump motor 3 and a pump shaft lead-through or wall entrance 2a. In addition, also shown in FIG. 1 are an inlet chamber 2.1 for the primary coolant medium, a pump suction chamber 2.2 and a pump pressure or outlet chamber 2.3. The chambers are separated from one another flow-wise by appropriate partitions 2.4. Finally, a tube sheet or support plate 1.1 and the schematically represented U-shaped tube bundle 1.2 of the steam generator are also shown in FIG. 1; the primary coolant supply and discharge lines are not illustrated, however, the live steam line 1.3, which will be discussed hereinafter in greater detail, is shown in part.

The rupture protection enclosure of the invention, generally designated BS, is formed in principle of a base B, a cover D and a shell or jacket M of tension-resistant and compression-resistant material such as steel, in the illustrated embodiment. The base B, the cover D and the shell or jacket M are connected to one another by axial tensioning elements which are distributed over the circumference of the shell or jacket M and are constructed as tensioning cables 5. At the ends thereof, the tensioning cables 5 have respective threaded shanks 5.1 (note, for example, FIG. 3a), onto which tensioning nuts 5.2 have been screwed. The rupture protection shell of jacket M is divided into individual cylinder sections or rings 4, which are axially joined together as shown in FIG. 1, for example, to form the rupture protection shell or jacket M, which, together with the base B and the cover D, and after the tensioning cables 5 are installed, forms the outer rupture protection system of the invention.

Between the outer skin 1a of the steam generator 1 and the shell or jacket M and the cover D, there are inserted segments 6 of compression-resistant, heat-insulating material, for example of so-called Leca concrete as in the illustrated embodiment, which, in the event of rupture, transmit the compressive forces exerted thereon to the shell or jacket M and the cover D. Subdivision of the shell or jacket M into the cylindrical sections 4 and the insulating intermediate layer into cylindrical segments 6 is advantageous, because assembly and disassembly of the rupture protection enclosure BS is facilitated thereby, in that the individual jacket sections 4 and insulation sections 6 can be stacked on top of one another from the bottom up and, also, accessibility of the steam generator is also provided thereby for in-service tests. In order to ensure free thermal expansion of the steam generator 1, it is advantageous to use the tensioning cables 5 without any or with only slight pretensioning, so that the stressing or tensioning thereof occurs only in the event of a rupture.

In accordance with the invention, the cover D is formed of an inwardly arched or concave, divided spherical shell 8 and an undivided support ring 7, the spherical shell 8, as a separate structural member, being braced with the outer rim surface 8.1 thereof, which is inclined to the horizontal in accordance with the concave curvature thereof and engages a correspondingly inclined inner ring surface 7.1 of the support ring (see FIG. 3a). As is evident from FIG. 1, the support ring 7 is included in the bracing assembly of the tensioning elements 5 i.e. it serves as the upper tensioning support or bearing, while the base B forms the opposing, lower tensioning support or bearing. In a preferred embodiment of the invention, the spherical shell 8 is divided into two parts so that, in accordance with FIG. 2, two equal spherical shell halves 8a and 8b are formed. This is of particular advantage for a steam generator wherein the live steam pipe line 1.3 (note FIGS. 1 and 2) extends centrally out of the surface of the cover of the steam generator housing. If the parting gaps or joints 8.2 of the spherical shell 8 are disposed so that the extension thereof intersects the pipe axis 1.3' and if one lets the spherical parts 8a, 8b surround the pipe 1.3 with sector-shaped recesses or cutouts 8.3 of the inner pheriphery thereof, then ready assembly and disassembly of the cover D is possible without having to abandon or relinquish the centricity of the live steam line 1.3. Removal of the cover D is effected by lifting the support ring 7 after the tensioning cables 5 have been removed, and shifting the support ring 7 laterally as far as possible. One of the cover halves 8a or 8b can be removed laterally. Thereafter, the support ring 7 is shifted toward the other side and the other of the cover halves 8b or 8a, respectively, is removed. Finally, the support ring 7 is set down again on the shell or jacket M. This shell or jacket M is also referred to as a fragment protection cylinder, although that does not exhaust its function, since it must intercept and absorb the radial forces in case of the very unlikely formation of a longitudinal or peripheral crack in the steam generator 1, while the tensioning cables 5 absorb the axial stress through the base B and the cover D. The base B and the support ring 7 are therefore provided with suitably dimensioned supporting or bearing cross sections. For the support ring 7, the supporting or bearing cross section is divisible advantageously in accordance with FIGS. 3a and 3b, wherein it is shown that the support ring 7' is formed of an inner ring part 7.2 and another ring part 7.3. As the schematically indicated force diagram of FIG. 3a shows, a bearing force $P_k$, which is exerted on an opposing surface 7.1 by the spherical shell 8 in the event the latter is stressed in compression, can be split into an axial force component $P_a$ and a radial force component $P_r$. The inner ring part 7.2 serves to take up this axial or vertical component $P_a$, as viewed in FIG. 3b, and introduces it into the axial tensioning elements 5.1. The radial force component $P_r$ is transmitted by the inner ring part 7.2 to the outer ring part 7.3, and the latter is therefore stressed in tension while the inner ring part 7.2 is stressed in compression. The outer ring part 7.3 is advantageously formed, for this purpose, of a metal strip or sheetmetal winding 9 which is applied to the outer periphery 7.4 of the inner ring part 7.2. The application can be effected in layers 9' with preheating; however, the metal strip or sheetmetal coil can also be fabricated as a whole separately and then, with preheating, shrunk onto the inner ring part 7.2. As is further shown in FIGS. 3a and 3b, the inner ring part 7.2 is constructed as a ribbed welded structure. It has at an end face thereof a flat ring member 7.5 formed with bores 10 for anchoring the tensioning elements 5, and, in addition, a ring of axially-radially disposed support ribs 7.6, which are disposed in peripheral spaces 10' between anchoring locations 10 of the axial tensioning elements. The inner ring part 7.2 also has contact ring parts 7.7 and 7.8 connected to the ribs 7.6, the contact ring part 7.8 being formed with the surface 7.1, which is of conical shape, having an angle of inclination of about 60°, the conical surface 7.1 being provided to support the correspondingly inclined opposing surface 8.1 of the spherical shell 8. Depending upon the curvature or arch of the spherical shell 8, the angle of inclination of the support or bearing surfaces 7.1 and 8.1 may differ, by being greater or smaller, and for practical embodiments it is, in particular, between 40° and 60°; through suitably apportioning the size of the axial and radial force components, the dimensions of the inner and outer ring parts being determinable. The contact ring part 7.8 is welded to the individual ribs 7.6 and, due to the substantially double-trapezoidal shape thereof, is in a position to introduce the force components into the ring or circle of the ribs 7.6, the peripheral surface $a1$ of the contact ring part 7.8, as well as the end face $a3$ and the inclined surface $a2$ thereof ensuring a positive force transmission. The contact ring part 7.7 is seated on the outer periphery of the ring of ribs 7.6 and welded to the latter and, together with the flat ring member 7.5, forms a flush cylindrical closure for applying the metal strip or sheetmetal winding 9 thereon. An adapter ring 4.1 disposed on the topmost cylinder section 4, with a spacer ring 4.2 interposed, ensures a surface or planar contact of the spherical shell 8 with the conical surface 4.3 of the adapter ring 4.1, which is matched to the curvature of the spherical shell 8, the contact therebetween being therefore free of local stress peaks.

Figure 4A:
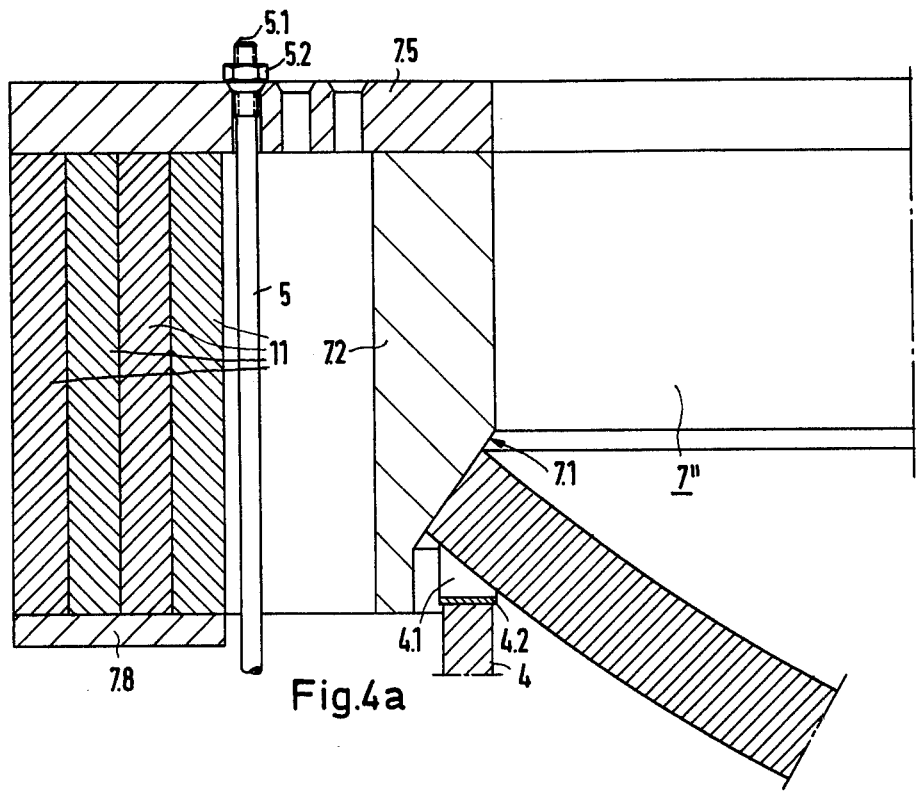
FIG. 4a is another enlarged fragmentary view of FIG. 1 showing a second modified form of the detail x with rings shrink-fitted onto the support ring.
Figure 4B:
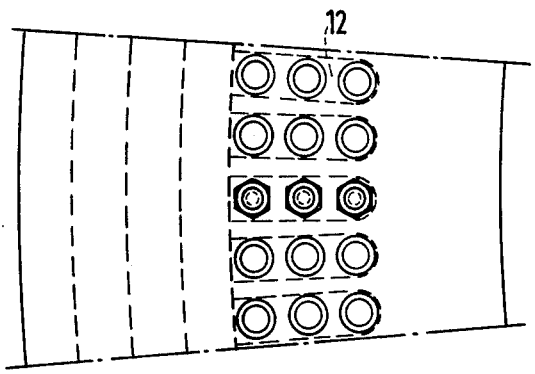

In the embodiment according to FIGS. 4a and 4b, shrink rings 11 are shrunk-fitted on the inner ring part 7.2. In the illustrated embodiment of FIGS. 4a and 4b, there are four layers of shrink rings which are secured immovable in the position thereof, after they have been shrunken onto the inner ring part 7.2, by bolting-on the flat ring member 7.5 to one end face of the rings 11 and a further lower ring plate 7.8 to the other end face of the rings 11. Axial channels 12 formed at the outer periphery of the inner ring part 7.2 serve to provide passage of the tensioning cables 5 therethrough. The channels 12 are formed as milled slots in the particular embodiment shown in FIGS. 4a and 4b. In general, those parts of the embodiment of FIGS. 4a and 4b which have the identical function as like parts in the embodiment of FIGS. 3a and 3b, are identified by the same reference characters.

It is apparent from FIG. 1 that the insulating concrete members 6 serve as an intermediate layer not only in the region of the shell or jacket M but also in the region of the cover D, so that they thereby ensure uniform introduction of force into the spherical shell 8 and, thereby, into the cover D. FIG. 1 as viewed in conjunction with FIG. 2, shows further that it may be advantageous to line the inner periphery of the spherical shell 8 with two half-shell members 13a and 13b, having a parting gap or joint that is preferably offset 90° relative to the parting gap of the spherical shell 8, as shown especially in FIG. 2, so that the live steam line 1.3 can be kept free of forces from the spherical shell 8. The two spherical half-shells 8a and 8b engage one another in the parting gap or joint region according to FIG. 5 with a trapezoidal slot 8.5 and a key 8.4, leaving gaps s for thermal expansion, so that they are fixed definitely with respect to one another. Although the division of the spherical shell 8 into two parts, as shown, is particularly advantageous, a division into three or more sectors of equal size would also be possible, but then it should be noted that a division into too many sectors causes a weakening of the arch so that it would therefore have to be made thicker.

Figure 6:
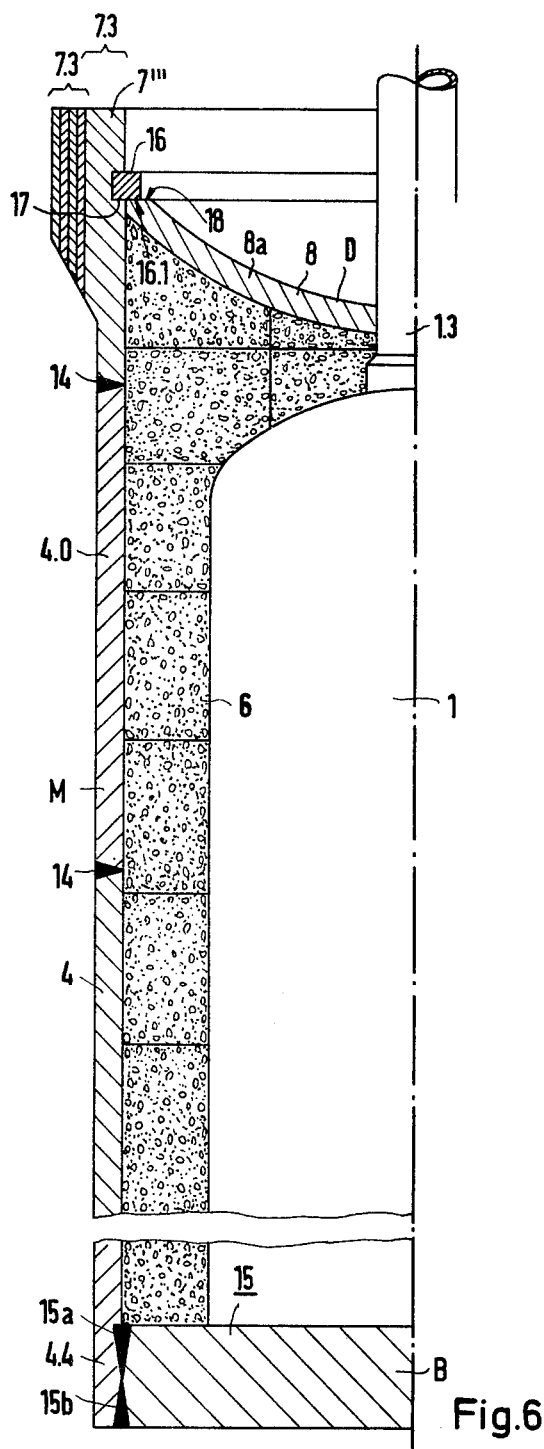
FIG. 6 is an enlarged half-sectional view of FIG. 1 showing another embodiment of the invention with a rupture protection shell formed of welded-together cylinder sections.

In the embodiment according to FIG. 6, the axially stressable connecting means are formed by circular welded seams 14, by means of which the cylinder sections 4 of the shell or jacket M are welded together and the upper end section 4.0 is welded to the support ring 7''' of the cover D. Moreover, those parts of the embodiment of FIG. 6 corresponding to like parts of the embodiments shown in the previous figures are identified by the same reference characters. The lower tubular end section 4.4 of the shell or jacket M, as viewed in FIG. 6, is joined to the base B also by a weld 15 and, in fact, circular welded means 15a and 15b of V-shaped cross section are provided thereat because of the thickness of the base B, the weldments 15a and 15b being producible in layers, using powder welding or the like so that a metallurgically perfect or trouble-free connection between the rupture protection shell or jacket M and the rupture protection base B is obtained. Only the left-hand half of the axial or longitudinal cross section is shown in FIG. 6, it being understood that the embodiment of FIG. 6 is substantially mirror-symmetrical and that the right-hand half thereof is substantially a mirror image of the illustrated half. The spherical parts 8a and 8b (the part 8b not being shown in FIG. 6) of the cover D are retained in braced condition at the support ring 7''' by a clip or shear ring 16 which is seated in an annular groove or slot 17 formed at the inner periphery of the support ring 7''', the spherical parts 8a and 8b having a planar annular zone 18 normal i.e. perpendicular, to the axis thereof, by which the spherical parts 8a and 8b engage the projecting clip ring countersurface 17.1. Assembly of the rupture protection enclosure B, M, D is effected from the bottom up, the individual cylinder sections 4 being welded together successively with the interposition of the insulating concrete segments 6. When the support ring 7''' has finally been welded on, the shell part of the cover D can then be brought into position and secured in that position thereof by inserting the clip or shear ring 16. It may be advantageous, in this regard, if the clip ring is constructed of winding head holders for turbo generators, in a conventional manner, as an open or cleft ring having a reducible diameter for the purpose of permitting insertion thereof, the open ring being capable of springing back due to the loosening of a non-illustrated clamping or tightening tool and being spreadable apart into the annular groove or slot 17.

I claim:

1. Rupture protection device for a steam generator of substantially cylindrical shape, the steam generator having a housing with a cover, comprising a rupture protection enclosure for surrounding the steam generator, said enclosure including a base, a cover and a jacket formed of tension-resistant and compression-resistant material, and axially stressable connecting means for connecting said base, said cover and said jacket to one another, said jacket being formed of substantially cylindrical sections, said cover being formed of a substantially concave spherical shell and a bearing ring, said spherical shell having an outer rim surface, said bearing ring being formed with an inner ring surface corresponding to said outer rim surface, said spherical shell being braced as a separate structural member through said outer rim surface thereof against said inner ring surface of said bearing ring, said bearing ring forming part of a bracing assembly comprising said base, said cover, and said substantially cylindrical jacket through the intermediary of said axially stressable connecting means, said spherical shell being divided into at least two partial shells, and a live steam line extending centrally out of the surface of the cover of the steam generator housing, said partial shells having a parting gap therebetween extending through a location at which the axis of the live steam line extends, said spherical partial shells being formed with sector-shaped recesses at a radially inner periphery thereof surrounding the live steam line.

2. Device according to claim 1 wherein said inner ring part is a ribbed welded structure comprising a flat ring member at an end face thereof, said axially stressable connecting means comprising elongated axial tensioning elements distributed over the periphery of said substantially cylindrical jacket and anchored to said cover at said flat ring member as well as to said base, said ribbed welded structure additionally including a ring of axially-radially extending support ribs disposed in spaces formed peripherally in said flat ring member between the locations at which said axial tensioning elements are anchored, said ribbed welded structure further including a first contact ring part connected to said support ribs at the inner periphery of said inner ring part for supporting said spherical shell, and a second contact ring part connected to said support ribs at the outer periphery of said inner ring part for supporting said outer ring part.

3. Device according to claim 1 including an intermediate layer formed of pressure-resistant thermally-insulating material disposed between said rupture protection enclosure and the steam generator and surrounding the steam generator in the region of said jacket, said intermediate layer also covering the steam generator at the region of said cover.

4. Device according to claim 1 wherein said bearing ring includes an inner ring part on which said inner ring surface is formed, said inner ring part serving to absorb a vertical component of a force transmissible by said cover, and for introducing said force into said bracing assembly, said bearing ring also including an outer ring part constructed for absorbing a radial component of said force transmissible by said cover, said outer ring part being of multilayer construction.

5. Device according to claim 4 wherein said outer ring part is formed of a sheet-metal winding applied to the outer periphery of said inner ring part.

6. Device according to claim 4 wherein said outer ring part is formed of shrink rings shrunk fit on the outer periphery of said inner ring part.

7. Device according to claim 1 wherein said spherical shell is divided into two shell parts, and including a shear ring seatable in an annular groove formed in the inner periphery of said bearing ring for retaining said shell parts in braced condition at said bearing ring, said shell parts having a planar annular zone extending normally to the axis of said spherical shell, and said shear ring having an opposing surface portion projecting from said annular groove, said planar annular zone of said shell parts engaging said opposing surface of said shear ring.

* * * * *